July 1, 1952     H. C. ERFURTH     2,601,728
HAY DRYING DEVICE
Filed Feb. 8, 1950     2 SHEETS—SHEET 2
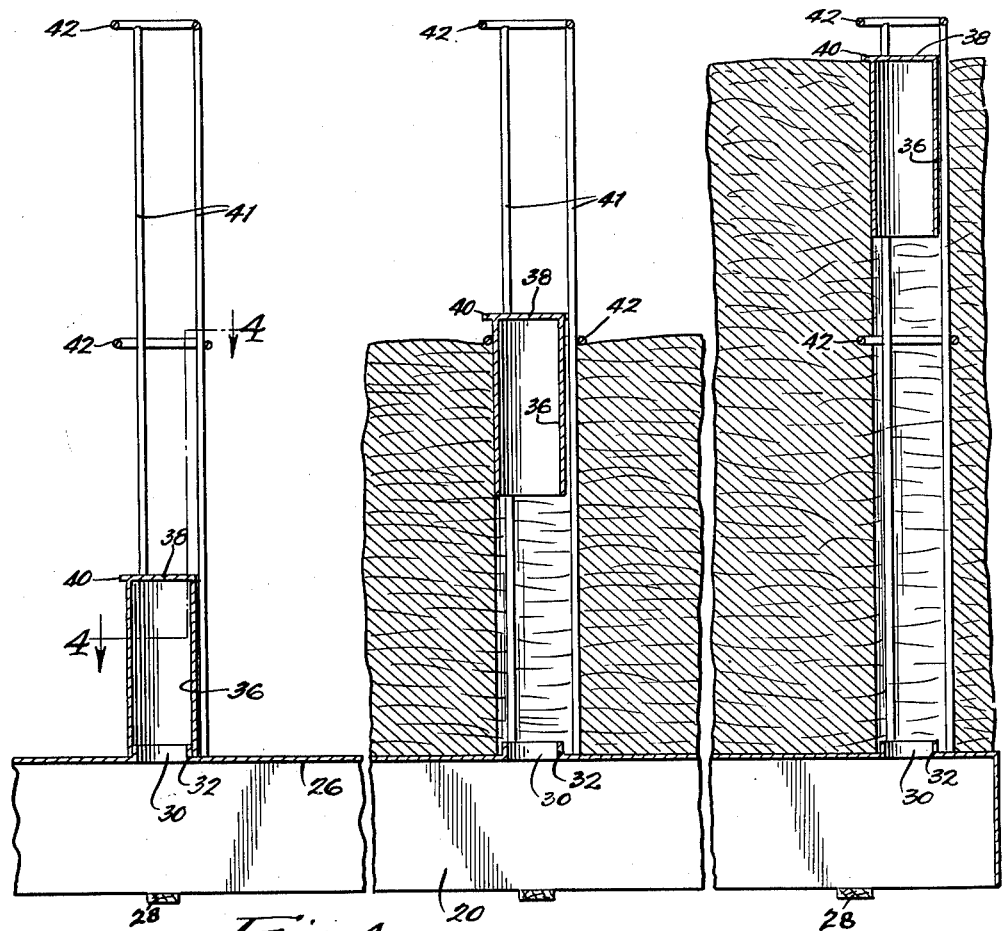
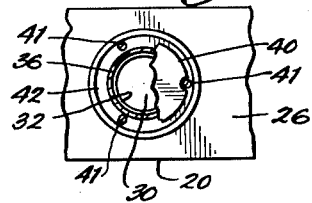
INVENTOR:
Herman C. Erfurth,
BY Dawson, Ooms, Booth and Spangenberg.
ATTORNEYS.

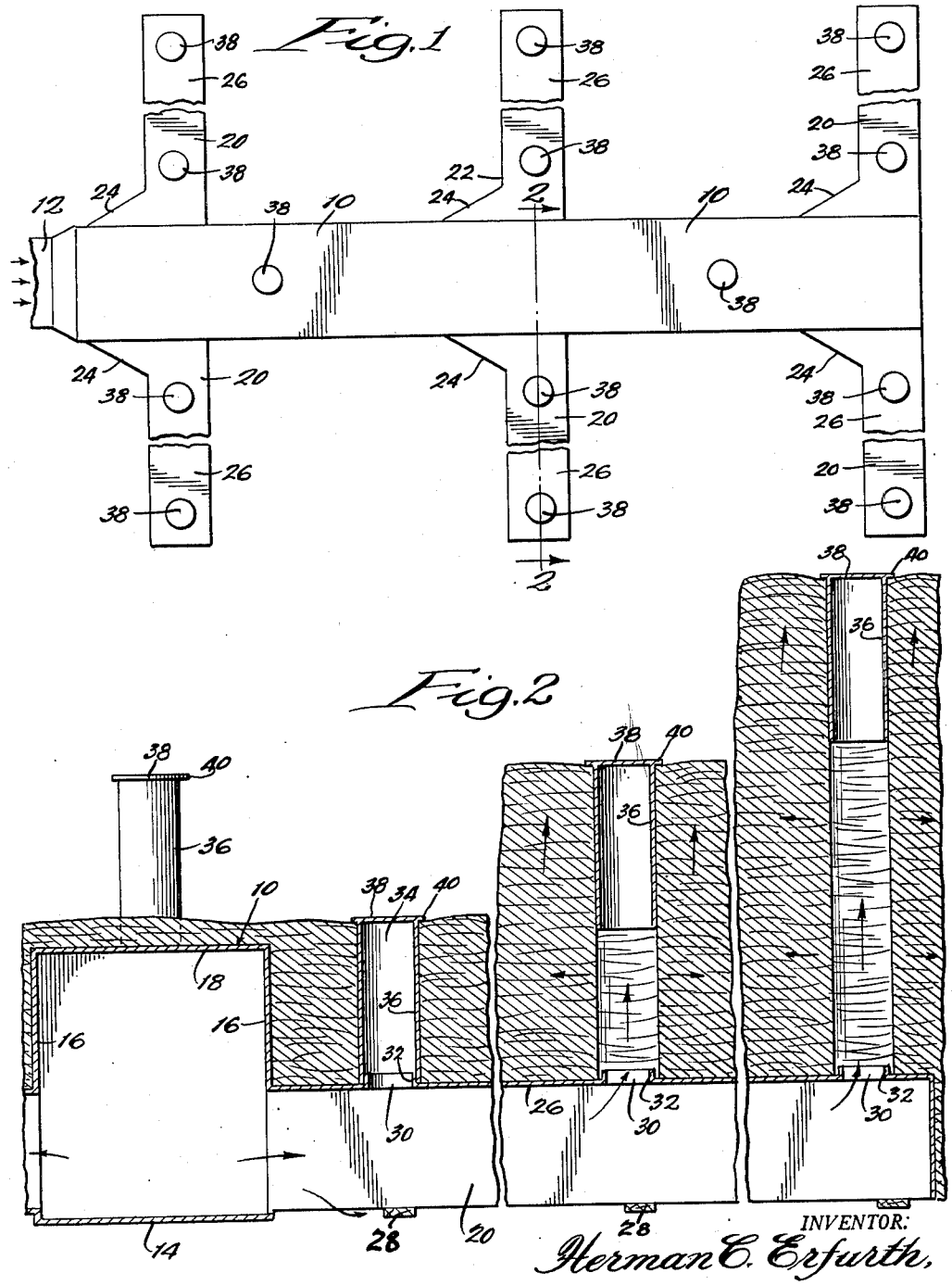

Patented July 1, 1952

2,601,728

UNITED STATES PATENT OFFICE 2,601,728

HAY DRYING DEVICE

Herman C. Erfurth, Verona, Wis., assignor of one-third to George T. Sutch, Lake Geneva, Wis.

Application February 8, 1950, Serial No. 143,120

2 Claims. (Cl. 34—239)

This invention relates to a means and method for drying hay. More particularly it relates to an apparatus for drying hay which can be installed in a barn loft, hay mow, stack, or any commercial drying house.

It is highly desirable, in order to retain the natural food qualities found in hay, to place hay in a barn loft or the like as soon as possible after mowing or cutting. The method generally employed today is to cut the hay and allow it to stand in the field until dried before storing the hay in a barn loft.

This is undesirable because the natural elements, such as the sun, rain, and variable temperature, are able to attack the cells of the hay which results in their decomposition and breakdown. This, of course, results in the loss of the food nutrients found in the hay. It has been estimated that over seventy-five percent of the original food values in hay are lost by this method.

Hay dried by my process and apparatus has been tested, and the results show that approximately ninety-five percent of the original food values in the hay are still retained.

Another disadvantage of drying hay by this method, is that the leaves of the hay dry out and become brittle from the sun's rays causing them to break off easily and fall to the ground. This, obviously results in a loss of the quantity of hay capable of being stored.

An object of my invention is to provide a process and apparatus for drying hay which is capable of retaining substantially all of the original food values in the hay.

Another object of my invention is to provide an improved inexpensive and simple construction for drying hay which is capable of thoroughly drying hay in a minimum amount of time.

Still another object of my invention is to set forth the method for completely aerating and drying hay inexpensively and in a minimum amount of time when the hay is stacked or stored in a loft or the like immediately after it has been cut in the field.

A still further object of my invention is to provide a means and method which are capable of receiving newly cut hay and drying the hay without fear of spontaneous combustion.

The above and other objects and advantages of the invention will become more readily apparent from the following description and by reference to the accompanying drawings, in which:

Figure 1 is a plan view of my invention showing a preferred way of its construction and layout;

Figure 2 is a side elevation view taken on line 2—2 of Figure 1. It shows my invention at successive steps during the storing of hay.

Figure 3 is a side elevation view of a modification of my invention showing the storing of hay at successive steps; and Figure 4 is a plan view of my invention taken on line 4—4 of Figure 3.

Figure 1 shows a preferred way of constructing my invention, wherein the main air channel 10, acts as a main conduit and reservoir for air blown in by a fan or the like, said fan being attached to a power source such as a conventional gasoline or electric engine at 12. Since the power source is not claimed, none of the details are shown. The main air channel 10 can be built or prefabricated to any desired height, width, or length, depending upon the size of the particular area in which it is laid and the amount of hay which it is normally expected to dry. The bottom 14 of the main air channel 10 is laid lengthwise atop the center of the floor of the loft or the like, and said enclosed channel 10 includes side walls 16 and a top 18.

Lateral flue feeds 20 extend out from the main air channel 10 for any desired distance, depending upon the width of the hay loft in which the hay is stored. The width and height of the lateral flue feeders 20 is at least one-half the width and height of the main air channel 10 in order to insure equal air pressure throughout the system. The number of flue feeders extending from the channel 10 depends upon the length of the barn loft or the like. A distance of at least fourteen feet between flue feeders has been found to produce the desired results. The side walls 16 of the channel 10 and the leading side walls 22 of the flue feeders 20 are cut back for a short distance to form a tapered wall 24. This is to permit easy access of the air to the lateral flue feeders, and to eliminate any vacuum which might be caused by the air "bending" around the corners into the flue feeders.

The flue feeders 20 comprise side walls 22 and a top 26. The bottom of the side walls 22 rest on small blocks 28 or the like and suspend the lateral flue feeders approximately one inch above the level of the floor. This allows air to escape under the bottom of the side walls 22 of the flue feeders into the mass of hay.

Air openings 30 having up-turned lips 32 are provided at spaced intervals in the top 26 of the flue feeders 20, and in the top 18 of the main air channel 10. The area of the air openings 30 are at least one-half of the area of the flue feeders 20, depending upon the number of air openings in each flue feeder, in order to insure equal air pressure throughout the system. The number of air openings 30 depends upon the width and length of the barn loft or similar storing place. A distance of approximately seven feet between each air opening has been found to produce the desired results.

Flue formers 34 comprising side walls 36 and a closed top 38 fit over and around the lip 32 of the air openings 30 in the flue feeders 20. The tops 38 of the flue formers 34 have projecting lips 40 around their exterior to permit lifting of the flue formers 34 as well as to support the flue formers on top of the hay.

A modification in the construction of my invention is shown in Figures 3 and 4. A plurality of rails or guides 41 are secured about the air openings 30 in the tops 18 and 26 of the main air channel 10 and flue feeders 20 respectively said rails or guides 41 extending upward for any desired distance. Braces 42 may be used to give strength and rigidity to the rails or guides 41 and are secured to the outer surface of the rails or guides. Notches are cut into the lips 40 of the flue formers 34 (as shown in Figure 4) so as not to impair easy vertical movement of the flue formers.

Operation

After the hay has been cut and transferred from the field to the place of stacking or storing, the hay is thrown or stacked upon my apparatus. Air is then blown into the main air channel 10 by a fan located at 12 of Figure 1, which fills up and creates an air pressure in the main air channel 10 forcing the air into the lateral flue feeders 20 from where the air escapes into the mass of hay surrounding and atop my apparatus.

When the level of the hay is lower than the tops 38 of the flue formers 34 the air can only escape into the mass of hay by seeping underneath the bottom of the side walls 22 of the flue formers 20 because the air openings 30 are capped by the flue formers 34. Thus the air percolates upward carrying the moisture in the hay with it.

When the level of the hay is higher than the tops 38 of the flue formers 34 which are resting over the air openings 30 the flue formers are accordingly raised to the level of the hay thereby forming a natural channel which maintains itself because of the density of newly cut hay. When the flue formers 34 are raised in this manner the air in the flue feeders is then also permitted to escape by this method into the surrounding mass of hay. Since the tops 38 of the flue formers 34 are sealed, the air can only escape into the hay at a distance lower than the bottom of the flue formers. Consequently the air must percolate for some distance upward through the hay carrying moisture with it in order to escape into the atmosphere.

Because of the lips 40 on the flue formers 34 and the density of newly cut hay, the flue formers are maintained in their raised position.

By using such flue formers and method a larger area of hay surface is exposed to the air resulting in a greater economy of expense in equipment and time necessary to dry the hay.

While two types of construction have been shown and described in detail, it will be apparent that other variations within the scope of the invention might be devised. It is therefore not intended that the invention be limited to the exact details of the described method or construction nor otherwise than by the terms of the appended claims.

I claim:

1. A hay-drying apparatus of the type described, comprising a centrally disposed main air channel, a plurality of flue feeder channels having air openings with upturned edges extending therefrom, said flue feeder channels in open communication with and extending substantially perpendicular from said main air channel, flue formers comprising side walls, a sealed top, an opening in the bottom which fits over and around the upturned edges of the air openings, and means for lifting the flue formers as hay is being stored in order that natural air channels are formed to allow air to escape from the apparatus to percolate through and remove the moisture from a mass of hay.

2. A hay-drying apparatus of the type described comprising a centrally disposed main air channel adapted to be supported for position in a horizontal plane, a plurality of flue feeder channels connected at their inner ends in open communication with and extending substantially perpendicular to said main air channel said flue feeder channels having air openings with upturned edges, and flue formers comprising side walls, a sealed top, and an opening in the bottom which fits over the air openings, and means for lifting the flue formers as hay is being stored in order that natural air channels are formed to allow air to escape from the apparatus to percolate through and remove the moisture from the mass of hay.

HERMAN C. ERFURTH.

REFERENCES CITED

The following references are of record in the file of this patent:

UNITED STATES PATENTS

| Number | Name | Date |
|---|---|---|
| 32,584 | Post | June 18, 1892 |
| 722,118 | Liles | Mar. 3, 1903 |
| 1,341,275 | McDowell | May 25, 1920 |
| 1,522,186 | Hiestand | Jan. 6, 1925 |

FOREIGN PATENTS

| Number | Country | Date |
|---|---|---|
| 62,736 | Germany | June 18, 1892 |